United States Patent [19]

Lippold et al.

[11] Patent Number: 4,489,511
[45] Date of Patent: Dec. 25, 1984

[54] HEATED PRE-DRYING CYLINDER FOR A STEAM-TROUGH MANGLE

[75] Inventors: Gerhard Lippold; Günther Thurner; Georgi Stojanow, all of Karl-Marx-Stadt, German Democratic Rep.

[73] Assignee: VEB Kombinat Textima, Karl-Marx-Stadt, German Democratic Rep.

[21] Appl. No.: 354,871

[22] Filed: Mar. 4, 1982

[30] Foreign Application Priority Data

Jul. 20, 1981 [DD] German Democratic Rep. .. 2319103

[51] Int. Cl.³ .............................................. D06F 71/34
[52] U.S. Cl. ............................................ 38/55; 34/119
[58] Field of Search ............. 38/55, 56, 57, 54, 58–61, 38/100; 34/119, 124

[56] References Cited

U.S. PATENT DOCUMENTS

| 702,687 | 6/1902 | Andree | 38/54 |
| 2,074,410 | 3/1937 | Matthews | 38/54 X |
| 2,930,153 | 3/1960 | Soble | 38/57 |
| 3,878,627 | 4/1975 | Mazzolla | 38/56 |
| 4,026,035 | 5/1977 | Dyer et al. | 34/119 X |

FOREIGN PATENT DOCUMENTS

| 418183 | 7/1955 | Fed. Rep. of Germany . | |
| 2219895 | 10/1973 | Fed. Rep. of Germany | 38/55 |
| 3105846 | 3/1982 | Fed. Rep. of Germany . | |
| 887470 | 2/1981 | France . | |
| 2069539 | 8/1981 | United Kingdom . | |

*Primary Examiner*—Henry S. Judon
*Assistant Examiner*—Andrew M. Falik
*Attorney, Agent, or Firm*—Jordan and Hamburg

[57] ABSTRACT

A laundry ironing system, comprising a pre-drying cylinder and at least one mangle cylinder and trough unit, in which a flowable heat carrier medium in the form of live steam that circulates through the mangle cylinder and trough unit and then through the pre-drying cylinder is depressurized within the pre-drying cylinder to generate flash steam which precipitates on the internal surface of the pre-drying cylinder when condensing, thus heating the pre-drying cylinder. The present invention is also directed to such a method of heating the pre-drying cylinder, by collecting the flowable heat carrier medium in the form of live steam, and directing the medium inside the pre-drying cylinder where the heat carrier medium is depressurized, resulting in the formation of flash steam precipitating on the internal surface of the pre-drying cylinder. The heat carrier medium is then withdrawn from the pre-drying cylinder.

9 Claims, 2 Drawing Figures

HEATED PRE-DRYING CYLINDER FOR A STEAM-TROUGH MANGLE

BACKGROUND OF THE INVENTION AND PRIOR ART STATEMENT

The invention relates to a steam trough mangle, which can also be referred to as a hot bed ironer, for drying and smoothing damp pieces of laundry, the contact surfaces of which are heated by means of a flowable heat carrier medium in the form of live steam.

Recently, the problem of saving energy and of optimizing the use of energy in technical processes has become increasingly more acute. This has especially affected the energy-intensive process of drying textiles, such as pieces of laundry, as it is carried out in steam-trough mangles for instance. The goal is to reduce the specific energy requirement for drying a piece of laundry. One way, among others, of achieving this aim is the pre-drying of such pieces of laundry before the calendering process itself.

Trough mangles are already known, in which pre-heating and pre-drying of the laundry pieces to be dried takes place by means of contact with a heated surface, before the calendering process itself is carried out (DE-Gm No. 1,789,610; 8 d; 20/04). The laundry is passed over a heated external surface of the trough mangle. Herein, however, the cold, damp laundry must slide on the heated contact surface. The thermal energy required for the pre-heating and pre-drying is withdrawn from the mangle, i.e., it needs to be additionally expended. Furthermore, this principle can be applied only with difficulty to multiple-trough mangles.

For this reason, it has already been proposed to use the condensate obtained from the heating of the trough mangles and the trough-bridges to heat a rotatably mounted and drivable pre-drying cylinder, arranged in front of a mangle unit, comprising a mangle cylinder and a trough-mangle that at least partially encircles the mangle cylinder on its jacket side, wherein, for the purpose of pre-drying of the laundry pieces, the latter are guided in such a way that they bear against the external wall of the pre-drying cylinder and partially rotate with such cylinder (DE Patent Application No. P 30 41 244.3).

For this purpose, the condensate is collected in a vessel, and guided from there by means of a pump, to channels arranged on the internal side of the hollow pre-drying cylinder and extending between the front ends thereof. Supply of the condensate to these channels is carried out at the front end of the pre-drying cylinder, while withdrawing is effected at the opposite end.

However, since the condensate is under high pressure, the depressurization which necessarily originates at the suctioning end of the pump by reason of the cavitation effect will lead to destruction of the pump.

Furthermore, with such an arrangement of the channels, sufficient uniform heat transfer to the surface of the pre-drying cylinder across its width cannot be achieved.

In order to obtain a satisfactory pre-heating or pre-drying of the laundry pieces, further guiding elements have been arranged in the area of the pre-drying cylinder, which the laundry pieces need to contact. Such guiding elements are heated with live steam, thus additional thermal energy is required. However, the desire to save energy in the steam-trough mangle is thereby not taken into account.

It is the object of the invention to improve the energy balance of the steam trough mangle.

SUMMARY OF THE INVENTION

The invention has the object of developing a method for operating a steam-trough mangle by systematically re-using the heat carrier medium serving to heat up mangle troughs and trough bridges as well as to provide a heated trough mangle for carying out this method.

The invention makes it possible to utilize a considerable portion of the heat for the drying process, which otherwise would be lost for technical utilization in the heated trough mangle along with the outflowing condensate. Nevertheless, the heat extracted from the condensate in this way may comprise up to ⅓ of the amount of heat, which can be expended in one of the subsequent mangle units for drying laundry pieces. This results in a substantial reduction of the energy requirement in the heated trough mangle, i.e., with the same amount of energy, a substantially higher quantity of the water contained in the laundry may be vaporized.

In addition, the invention allows for optimal utilization of the flash steam that is formed on de-pressurization of the high-pressure condensate. Use of the invention herein, makes it possible to avoid the high expenditures and related problems which would result from a condensate-depressurizaton unit with its space requirements and the pertinent parts, such as a condensate-depressurization vessel, level regulator, fittings, measuring devices, etc.

The mode of heating the pre-drying cylinder under this invention ensures maximum and, above all, uniform heat transfer over the whole width from the flash steam and the pressure-reduced condensate to the surface of the pre-drying cylinder and, thereby, onto the laundry that is resting thereon.

In addition, according to the method of this invention, the condensate is sub-cooled to such an extent that an undesirable de-pressurization formation outside the heated trough mangle can no longer originate. Thus, a major problem has been solved at the same time.

BRIEF DESCRIPTION OF THE DRAWINGS

The invention will now be explained in more detail by way of an example of an embodiment.

In the drawings.

DETAILED DESCRIPTION OF PREFERRED EMBODIMENTS

Figure 1:
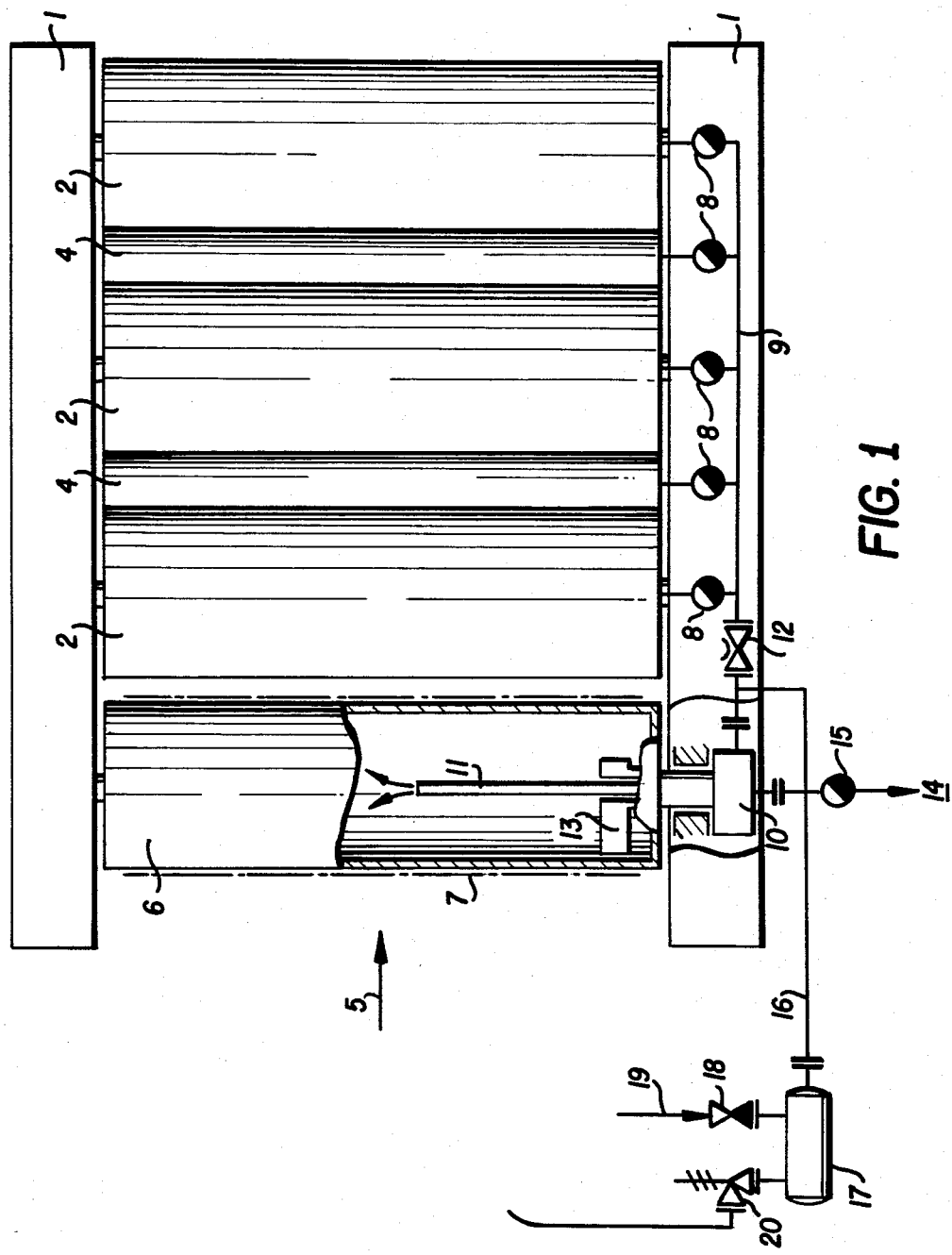
FIG. 1 illustrates a top view of a steam trough mangle according to the present invention with a schematic representation of the elements necessary for carrying out the method of the invention.

In the present invention, a heated trough mangle comprises, in substance, two side stands 1, between which at least one drivable mangle cylinder 2 has been arranged in rotatable form. The mangle cylinder 2 is encircled by a mangle trough 3, adjusted to its circumferential surface, at a center angle that is at least 120°, but is usually about 180°, and is pressed against the mangle trough 3 during operation of the heated mangle trough. In each case, one mangle cylinder 2 and at least one (in the present example exactly one) mangle trough 3 form a mangle unit 2; 3. If the heated trough mangle comprises several of such mangle units 2; 3 in sequence, then the passages between adjoining mangle troughs are provided by the trough bridges 4.

Both the mangle troughs 3, and the trough bridges 4, are heated. For this purpose, a flowable heat carrier medium is utilized, such as high-pressure steam, heat carrier oil, etc.. The steam trough mangle, to which the invention relates, is heated by live steam.

A rotatably mounted and drivable hollow pre-drying cylinder 6 has been arranged in front of the mangle unit 2; 3 in the direction of passage 5 of the heated trough mangle. This pre-drying cylinder 6 is also heated, in which the energy required for this purpose is extracted from the condensate formed from the steam serving for heating the mangle troughs 3 and the trough bridges 4.

The method of this invention for operating such a steam trough mangle now provides supplying the condensate to the pre-drying cylinder 6 at increased pressure, i.e. at the pressure existing in the heating elements of the mangle troughs 3 and the trough bridges 4. In a heated trough mangle of the previously-described type, such pressure may be approximately 1.2 MPa.

The method of this invention has an object of effecting pressure reduction of the condensate to a lower pressure level directly within or close to a feed opening of the pre-drying cylinder 6. This makes it possible to take full advantage of the flash steam formed as a result of the pressure reduction, in order to heat the pre-drying cylinder 6, in that while being condensed, it is precipitated, on the internal jacket surface thereof, delivering a portion of its heat especially its heat of condensation to the cylinder jacket. Another heating effect is provided by the condensate itself, which collects in the lower area of the pre-drying cylinder 6 and, in view of rotation of the pre-drying cylinder, also comes into contact with the entire circumferential area of the internal jacket surface.

The condensate which has been pressure-reduced to a lower pressure range, is withdrawn from the pre-drying cylinder 6 for further use in the final stage of the method of present invention.

The lower pressure range to which the condensate has been pressure-reduced may be the atmospheric pressure in the most elementary case. It should, however, preferably correspond to the pressure existing in the condensate collecting system of the steam trough mangle, possibly even to that of the entire laundry operation. Such pressure range may, for example, be around 0.25 MPa.

The heated trough mangle, which the method of the present invention is intended to operate, has already been generally described above.

The pre-drying cylinder 6 is arranged in front of the first mangle unit 2; 3 is a hollow cylinder, on the jacket surface of which the laundry to be calendered is guided so as to partially rotate therewith. For this purpose, a known belt conveyer device 7 is provided on pre-drying cylinder 6.

The mangle troughs 3 and mangle bridges 4 are provided with heating elements in a known manner, serving to transfer the heat energy from the steam to the contact surface of these components. Since the feeding of the steam to the mangle troughs 3 and trough bridges 4 is not important in this context, it has not been represented in the drawings.

Condenser traps 8 are provided on the mangle troughs 3 and mangle bridges 4 for the purpose of carrying the condensate of the steam from mangle troughs 3 and mangle bridges 4. These are connected with each other through a common condensate collection line which leads to a transfer device 10. Such transfer devices 10 are also known and serve to transfer a flowable medium from a stationary line to a rotatably mounted machine element or vice-versa. The transfer device 10 thus connects the condensate collecting line 9 with the internal chamber of the rotating pre-drying cylinder 6. An inflow tube 11 which extends into the internal chamber may be conveniently connected to the transfer device.

A throttle 12 has been arranged directly in front of the transfer device 10 in the condensate collecting line.

The pre-drying cylinder is additionally provided with a device for withdrawing the condensate.

This is preferably a spiral scoop 13. This scoop, in turn, is connected via the transfer device 10 to a condensate collecting system 14 of the laundry operation. For this purpose, another condensate trap 15 is provided after the transfer apparatus 10. A line 16 which connects the steam distributor 17 to the pre-drying cylinder 6 opens into the condensate collecting line 9, between throttle 12 and the entrance of the transfer apparatus 10. A live steam supply line 19 may be connected to steam distributor 17 over a non-return valve 18, while safety valve 20 is always provided.

Figure 2:
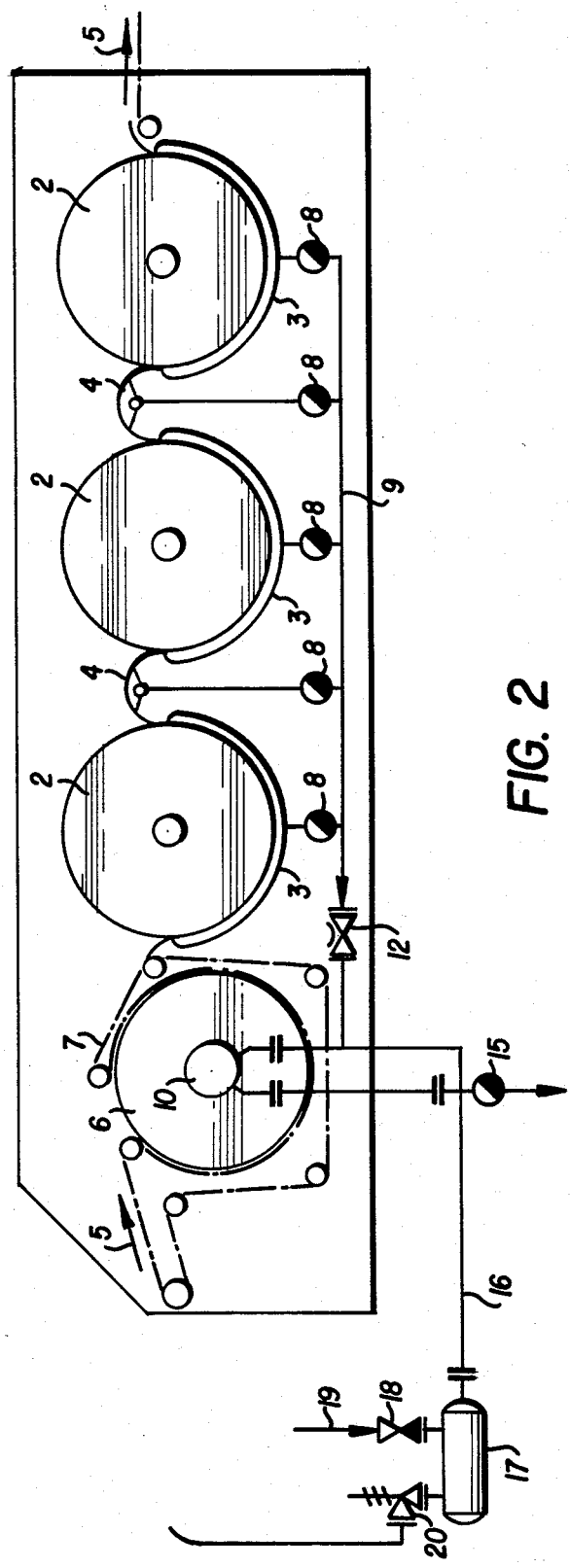
FIG. 2 is a schematic side view of a heated trough mangle according to the invention.

As illustrated in FIG. 2, it is also possible to connect the line 16 between the outlet of the transfer device 10 and the condensate trap 15.

The heated trough mangle described in the present invention operates in the following way:

The laundry pieces to be calendered, are transferred in the usual manner to the heated trough mangle, by a feeding machine which, for example, may be arranged in front of the mangle if viewed in the direction of passage 5. They are grasped by the conveyor belt apparatus 7 of the pre-drying cylinder 6 bearing firmly against the latter i.e., without any relative movement in relation to its surface, and are guided to partially rotate with it. Thereafter, the laundry pieces pass through the subsequent mangle units 2,3 in a known manner, where they are dried and smoothed. The laundry is heated and pre-dried by its contact with the jacket surface of the pre-drying cylinder so that the contact surface of the mangle trough 3 in the first mangle unit 2,3 can be more efficiently used for the drying and smoothing of laundry.

The temperature difference between laundry and mangle trough 3 is substantially lower as compared to a heated trough mangle without such a pre-drying cylinder 6. Therefore, the laundry needs to be heated to a lesser degree, in order to effect evaporation of the water it contains, so that this process starts shortly after the laundry contacts the mangle trough 3. For this purpose, the pre-drying cylinder 6 is heated by the condensate of the steam serving to heat the steam trough mangle.

The condensate is then fed through the condensate traps 8 under the high pressure that exists therein from the mangle troughs 3 and the trough bridges 4, to the condensate collecting line 9. The throttle 12 arranged therein causes this high pressure to remain present until a short distance in front of the inlet of the transfer apparatus 10, virtually preventing the formation of flash steam. The condensate passing through the throttle 12 is de-pressurized to a lower pressure range so that a mixture of flash steam and condensate is formed in the pre-drying cylinder, the mixture separating in after exiting from inflow tube 11.

The liquid condensate collects in the lower area of the hollow pre-drying cylinder 6 due to the force of gravity. It is constantly circulated during rotational movement of the cylinder, coming successively into contact with the entire internal jacket surface of the pre-drying surface 6 so that it can deliver heat to it.

The flash steam, in contrast, precipitates under condensation on the remaining free internal jacket surface, thereby contributing to the heating of the pre-drying cylinder 6.

Withdrawal of this condensate from the pre-drying cylinder 6 is accomplished by means of the spiral scoop 13.

The interior of the pre-drying cylinder 6 is secured against exceeding a specific pressure range by means of a safety valve 20.

The pressure formed in the pre-drying cylinder 6 may correspond to the atmospheric pressure, if the pre-drying cylinder 6 is connected directly to the atmosphere. This, however, will be an exceptional case.

In the preferred embodiment of a heated trough mangle illustrated in the drawing, this pressure depends on the pressure that exists in the condensate collecting system 14. If the pressure in the pre-drying cylinder 6 falls below a specific level because the amount of precipitating condensate is too low, the situation can be remedied by introducing live steam through the fresh steam line 19 for a short time into the pre-drying cylinder 6.

On the other hand, the non-return valve 18 will prevent any flash steam from getting into the live steam line 19.

We claim:

1. A laundry ironing system, comprising
   (A) a cylinder for pre-drying laundry to be ironed,
   (B) at least one mangle cylinder and trough unit for ironing said laundry, said mangle cylinder rotatably mounted and drivable, and said mangle trough remaining stationary and partially encircling said mangle cylinder, said mangle cylinder and trough unit receiving a flowable heat carrier medium in the form of live steam supplied from a source outside of said mangle cylinder and trough unit to dry the laundry while the laundry passes through the mangle cylinder and trough unit, and
   (C) means for conveying the condensate of the steam under pressure from said mangle cylinder and trough unit directly to said pre-drying cylinder, in which said condensate of the steam under pressure is depressurized within said pre-drying cylinder to generate flash steam therein, said flash steam precipitating on the internal surface of said pre-drying cylinder on condensation, and heating said pre-drying cylinder.

2. The system of claim 1 additionally comprising
   (D) at least one trap situated in said conveying means at said at least one mangle cylinder and trough unit, said trap collecting said flowable heat carrier medium from said at least one mangle cylinder and trough unit in the form of condensate, and
   (E) means for withdrawing said flowable, heat carrier condensate from said pre-drying cylinder.

3. The system of claim 2 comprising
   (B) a plurality of mangle cylinder and trough units,
   (F) at least one trough bridge connecting successive pairs of mangle cylinder and trough units, and
   (D) at least three traps situated in said conveying means, with a trap situated at each mangle cylinder and trough unit and at said at least one trough bridge for collecting said condensate.

4. The system of claim 3 additionally comprising
   (G) a throttle device situated in said conveying means at a point just before said condensate enters said pre-drying cylinder.

5. A method of ironing laundry in a system including a pre-drying cylinder and at least one mangle cylinder and trough unit comprising the steps of
   (A) collecting pressurized condensate of live steam supplied from a source outside of said mangle cylinder and trough unit used to heat at least one mangle cylinder and trough unit for ironing said laundry,
   (B) directing said pressurized condensate directly inside a cylinder for pre-drying laundry to be ironed,
   (C) depressurizing said pressurized condensate within said pre-drying cylinder, resulting in the formation of flash steam which precipitates and condenses on an internal surface of said pre-drying cylinder, and
   (D) withdrawing said depressurized condensate from said pre-drying cylinder.

6. The method of claim 5 in which in step (C) said condensate is reduced to approximately atmospheric pressure within said cylinder.

7. The method of claim 5 in which in step (C) said condensate is reduced from a pressure of about 1.2 MPa within said cylinder to a pressure of about 0.25 MPa.

8. The method of claim 5 additionally comprising the step of
   (E) introducing live steam into said pre-drying cylinder for a short period of time if the level of condensate within said pre-drying cylinder falls too low.

9. A laundry ironing system, comprising
   a cylinder for pre-drying laundry to be ironed,
   at least one mangle cylinder and trough unit for ironing said laundry, said mangle cylinder rotatably mounted and drivable, and said mangle trough remaining stationary and partially encircling said mangle cylinder, said mangle cylinder and trough unit receiving a flowable heat carrier medium in the form of live steam to dry the laundry while the laundry passes through the mangle cylinder and trough unit,
   means for conveying the condensate of the steam under pressure from said mangle cylinder and trough unit to said pre-drying cylinder, in which said condensate of the steam under pressure is depressurized within said pre-drying cylinder, to generate flash steam therein, said flash steam precipitating on the internal surface of said pre-drying cylinder on condensation, and heating said pre-drying cylinder, and
   a throttle device situated in said conveying means at a point just before condensate enters said pre-drying cylinder.

* * * * *